United States Patent [19]

Weyland et al.

[11] Patent Number: 5,401,582
[45] Date of Patent: Mar. 28, 1995

[54] AQUEOUS POLYURETHANE FORMULATIONS

[75] Inventors: Peter Weyland, Frankenthal; Karl Haeberle, Neustadt; Reinhard Treiber, Leimen, all of Germany

[73] Assignee: BASF Aktiengesellschaft, Ludwigshafen, Germany

[21] Appl. No.: 242,077

[22] Filed: May 13, 1994

Related U.S. Application Data

[63] Continuation of Ser. No. 11,099, Jan. 29, 1993, abandoned, which is a continuation of Ser. No. 651,602, Feb. 6, 1991, abandoned.

[30] Foreign Application Priority Data

Feb. 6, 1990 [DE] Germany .......................... 4003422.4

[51] Int. Cl.$^6$ .......................... B32B 9/02; B32B 9/04; B32B 27/00; C14C 9/00
[52] U.S. Cl. .......................... 428/473; 428/151; 428/423.4; 428/540; 524/591; 528/66; 528/67; 528/76; 528/85
[58] Field of Search .................. 524/591; 528/66, 67, 528/76, 85; 428/473, 540, 151, 423.4

[56] References Cited

U.S. PATENT DOCUMENTS

| | | | |
|---|---|---|---|
| 4,772,289 | 9/1988 | Anzinger et al. | 427/323 |
| 4,895,894 | 1/1990 | Ruetman et al. | 524/840 |
| 4,983,662 | 1/1991 | Overbeek et al. | 524/591 |
| 5,135,963 | 8/1992 | Haeberle | 522/84 |

FOREIGN PATENT DOCUMENTS 3625442  11/1987  Germany .
3641494   6/1988  Germany .

Primary Examiner—Paul R. Michl
Assistant Examiner—Patrick Niland
Attorney, Agent, or Firm—Oblon, Spivak, McClelland, Maier, & Neustadt

[57] ABSTRACT

A finished leather comprising a leather to which has been applied a fat liquoring and/or water repellant agent, and a particularly formulated polyurethane adhesive improving bottoming coat composition applied thereto.

5 Claims, No Drawings

AQUEOUS POLYURETHANE FORMULATIONS

This application is a continuation of application Ser. No. 08/011,099, filed on Jan. 29, 1993, now abandoned; which is a continuation of Ser. No. 07/651,602, filed on Feb. 6, 1991, now abandoned.

The present invention relates to aqueous polyurethane formulations containing from 10 to 60% by weight of one or more polyurethanes A which are composed of a) one or more organic diisocyanates or a mixture of organic isocyanates which has an arithmetic mean NCO functionality of from 1.9 to 2.3 [monomers I], b) one or more dihydric polyether alcohols having a number average molecular weight of from 500 to 5,000 or a mixture of polyetheralcohols which has an arithmetic mean functionality of alcoholic OH groups of 1.6 to 2.3 and a number average molecular weight of from 500 to 5,000 [monomers II], c) one or more alcohols containing from 1 to 3 alcoholic OH groups and not less than one ionic group [monomers III], d) no dihydric alcohols or one or more dihydric alcohols having a number average molecular weight of from 62 to 499 or a mixture of alcohols which has an arithmetic mean functionality of alcoholic OH groups of from 1.9 to 2.3 and a number average molecular weight of from 62 to 499 [monomers IV], e) no monohydric polyetheralcohols or one or more polyetheralcohols [monomers V] and f) one or more polyamines having not less than two

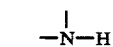

groups or no such polyamines [monomers VI],
with the proviso that the amounts of incorporated monomers I to VI are such that the ratios of the number of equivalents of OH to that of NCO are from 0.2 to 0.6 for the incorporated monomers II/-monomers I from 0.2 to 0.8 for the incorporated monomers III/-monomers I, from 0 to 0.2 for the incorporated monomers IV/monomers I and from 0 to 0.2 for the incorporated monomers V/monomers I and the ratio of the number of equivalents of —N—H to that of NCO is from 0 to 0.1 for the incorporated monomers VI/monomers I, that the arithmetic mean functionality of all the monomers I to V incorporated is from 1.8 to 2.3, averaged over the sum of the NCO groups of the monomers I and the alcoholic OH groups of the monomers II to V, that the ratio of the number of equivalents of NCO to that of

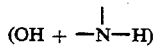

for the incorporated monomers I, the OH groups for the incorporated monomers II to V and the

groups of the incorporated monomers VI is from 0.9 to 1.0 and, where monomers VI are simultaneously incorporated, the ratio of the number of equivalents of NCO to that of OH for the incorporated monomers I and the sum of the incorporated monomers II to V is greater than 1, that the monomers II have a degree of ethoxylation of less than 30% by weight, that the monomers V have a degree of ethoxylation of not less than 40% by weight and that from 0.05 to 0.2 mmol of the ionic groups of the incorporated monomers III are present in ionized form per gram of polyurethane A in the aqueous formulation.

The present invention furthermore relates to a process for the preparation of these formulations and the use of these formulations as a bottoming coat for finishes on leathers which have been fatliquored and/or rendered water repellant.

A leather finish is the protective layer which is applied to the leather dried after it has been tanned, fatliquored and/or rendered water repellant, in order to protect the leather, in particular from soiling and damage, or to modify the surface properties of the leather with regard to properties such as color or gloss. The addition of fatliquoring agents and/or water repellants to the leather imparts to it the desired softness and the required water repellant properties.

One of the requirements for a leather finish is that it adheres well to the leather. However, particularly in the case of leathers which have been highly fatliquored and/or rendered water repellant to a great extent, the adhesion of most leather finishing systems is unsatisfactory. There is therefore a need for leather finishing assistants which can be applied to the leather which has been fatliquored and/or rendered water repellant as a bottoming coat before the actual leather finish and which impart high adhesive strength to the subsequently applied leather finish without at the same time substantially reducing the effect of the fatliquoring and-/or water repellant treatment.

DE-C 36 25 442 discloses aqueous dispersions of aliphatic, anionic polyurethanes which have terminal urea groups and are recommended as a bottoming coat for leather finishes on leathers which have been fatliquored and/or rendered water repellant, without adversely influencing the effect of the water repellant treatment. However, the disadvantage of these dispersions is that they must additionally contain short-chain and/or medium-chain alkyl ether phosphate plasticizers.

It is an object of the present invention to provide aqueous polyurethane formulations which do not contain low molecular weight additives and are suitable in particular as a bottoming coat for finishes on leathers which have been fatliquored and/or rendered water repellant, without substantially reducing the effect of the fatliquoring and/or water repellant treatment.

We have found that this object is achieved by the aqueous polyurethane formulations defined at the outset.

Monomers I which are of particular interest are aliphatic, aromatic and araliphatic diisocyanates, such as tetramethylene diisocyanate, hexamethylene diisocyanate, dodecamethylene diisocyanate, 1,4- diisocyanatocyclohexane, 4,4'-di-(isocyanatocyclohexyl)-methane, trimethylhexyl diisocyanate, 1-isocyanato-3,3,5-trimethyl-5-isocyanatomethylcyclohexane (isophorone diisocyanate), 2,4-diisocyanatotoluene, 2,6-diisocyanatotoluene, tetramethylxylylene diisocyanate, 1,4-diisocyanatobenzene, 4,4'-diisocyanatodiphenylmethane, p-xylylenediisocyanate and isopropenyldimethyltoluylene diisocyanate. Other suitable monomers I are the polyisocyanates which are derived from these diisocyanates, may have a higher functionality and contain carbodiimide, allophanate, isocyanurate, urethane and/or biuret groups, and monoisocyanates, such as phenyl isocyanate, cyclohexyl isocyanate, hexyl isocyanate or dodecyl isocyanate. 2,4- and 2,6-diisocyanato toluene and mixtures thereof, hexamethylene diisocyanate, 1-isocyanato-3,3,5-trimethyl-5-isocyanatomethylcyclohexane and 4,4'-di-(isocyanatocyclohexyl)-methane are preferably used. Aliphatic monomers I are preferably used for the preparation of products which do not yellow in the presence of light.

Particularly suitable monomers II are dihydric polyetheralcohols, as obtainable, for example, by polymerization of ethylene oxide, propylene oxide, butylene oxide, tetrahydrofuran, styrene oxide or epichlorohydrin with themselves, for example in the presence of boron trifluoride, or by an addition reaction of these compounds, as a mixture or in succession, with initiators having reactive hydrogen atoms, such as amines or alcohols. Particularly suitable monomers II are polyetherdiols which contain not less than 70% by weight of identical or different units of the structure

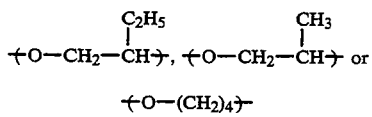

Ionic groups of the monomers III are groups which, as such or after suitable modification, for example by neutralization or quaternization, are present in partly or completely ionized form in an aqueous medium, with the exception of —N—H groups. This modification can be carried out, as a rule, before, during and/or after the preparation of the polyurethane A. Modification is preferably effected after the preparation of the polyurethane A.

Examples of ionic groups are acid functions, such as carboxyl or sulfo groups, which may additionally be modified by neutralization with bases, or tertiary amines which can be converted into ammonium ions by quaternization or by addition of an acid. Inorganic or organic bases, such as alkali metal hydroxides, alkali metal carbonates, alkali metal bicarbonates, ammonia or primary or secondary and, preferably, tertiary amines, eg. triethylamine, dimethylaminoethanol or dimethylaminopropanol, and inorganic or organic acids, such as hydrochloric acid, acetic acid, fumaric acid, maleic acid, lactic acid, tartaric acid, oxalic acid or phosphoric acid, are suitable for modifying ionic groups by neutralization. Suitable quaternizing agents are methyl iodide, methyl chloride, dimethyl sulfate, benzyl chloride, ethyl chloroacetate or bromoacetamide.

Preferably used monomers III are dihydroxycarboxylic or -sulfonic acids of 4 to 10 carbon atoms or N-alkyldialkanolamines, such as N-methyldiethanolamine or N-ethyldiethanolamine. Dihydroxycarboxylic acids of 5 to 10 carbon atoms, of the general formula

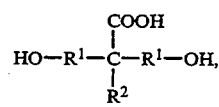

where $R^1$ is alkylene and $R^2$ is alkyl, in particular dimethylolpropionic acid, are particularly preferred. The novel polyurethane formulations advantageously contain polyurethanes A in which, per gram of polyurethane A, from 0.1 to 1.2 mmol of the ionic groups of the incorporated monomers III are present in ionized form in the aqueous formulation.

Suitable monomers IV include 1,2-ethanediol, 1,2-propanediol, butanediols, 1,4-butenediol, 1,4-butynediol, pentanediols, hexanediols, octanediols, 1,4-bis-hydroxymethylcyclohexane, 2,2-bis-(4-hydroxycyclohexyl)propane, 2-methyl-1,3-propanediol, glycerol, trimethylolpropane, 1,2,6-hexanetriol, 1,2,4-butanetriol, pentaerythritol, sorbitol, diethylene glycol, triethylene glycol, tetraethylene glycol, dipropylene glycol and dibutylene glycol.

Particularly interesting monomers V which may also be present are monohydric polyetheralcohols whose number average molecular weight ($\overline{M}_n$) is from 500 to 10,000, preferably from 1,000 to 5,000. They are obtainable, for example, by alkoxylation of monohydric alcohols, such as methanol, ethanol or n-butanol, for example, ethylene oxide or propylene oxide being used as the alkoxylating agent. The degree of ethoxylation of the monomers V is preferably more than 60% by weight.

The monomers VI preferably have a molecular weight of from 32 to 500. Examples of suitable monomers VI are diamines, such as 1,2-diaminoethane, 1,6-diaminohexane, piperazine, 2,5-dimethylpiperazine, 1-amino-3-aminomethyl-3,5,5-trimethylcyclohexane (isophoronediamine), 4,4'-di-(aminocyclohexyl)-methane, 1,4-diaminocyclohexane, 1,2- and 1,3-diaminopropane, hydrazine, hydrazine hydrate, triamines, such as diethylene triamine, or tetramines, such as N,N'-bis-(3-aminopropyl)-1,4-diaminobutane. However, other suitable monomers VI are ketimines, as described in DE-B-27 25 589, ketazines, such as those of DE-B-28 11 148 and of U.S. Pat. No. 4,269,748, amine salts, such as those in U.S. Pat. No. 4,292,226, or oxazolidines, as described in DE-B-27 32 131 and U.S. Pat. No. 4,192,937. These are blocked polyamines, from which the corresponding polyamines are liberated as intermediates in the presence of water. Other particularly suitable monomers VI are polyamines which carry one or more alcoholic hydroxyl groups. The polyurethanes A preferably contain no monomers VI.

Other examples of monomers I to VI which are suitable for the synthesis of the polyurethanes A are described in, for example, High Polymers, Vol. XVI, Polyurethanes, Chemistry and Technology, Interscience Publishers, New York, Vol. I, 1962, pages 32-42, pages 44-54, and Vol. II, 1964, pages 5-6 and pages 198-199.

The polyurethanes A preferably contain only monomers I to IV which have two isocyanate groups or two alcoholic OH groups. The amounts of incorporated monomers I to VI are advantageously such that the ratio of the number of equivalents of NCO to that of

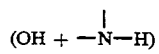

for the incorporated monomers I, the OH groups of the incorporated monomers II to V and the

groups of the incorporated monomers VI is from 0.95 to 1.0.

The novel aqueous polymer formulations are advantageously prepared by a method in which the monomers I to V are reacted in the melt or in the presence of an inert, water-miscible solvent, such as acetone, tetrahydrofuran, butanone or N-methylpyrrolidone, at from 20° to 160° C., preferably from 50° to 100° C., the reaction time usually being such that the reaction products contain unconverted NCO groups in an amount which is not more than 0.2% by weight, based on the total amount of the reaction mixture (the term reaction mixture does not include the solvent), above the value achieved for the given stoichiometry in the case of complete reaction. As a rule, from 2 to 10 hours are required for this purpose. The reaction can be accelerated by the presence of substances having a conventional catalytic activity, such as dibutyltin dilaurate, tin(II) octoate or 1,4-diazabicyclo[2.2.2]octane, usually in amounts of from 10 to 1,000 ppm, based on the reaction mixture. Thereafter, dilution is, if necessary, carried out using a water-miscible solvent, ionic groups of the monomers III may be ionized by neutralization or quaternization and water is added.

The organic solvents which may be present are then usually distilled off, so that preferred solvents are those whose boiling point is below the boiling point of water. If monomers VI are also incorporated in the polyurethane V, they are added to the aqueous reaction mixture containing the prepolyurethane composed of the monomers I to V preferably by stirring in at from 20° to 50° C. The added amount of water is usually such that the novel aqueous polyurethane formulations have a solids content of from 10 to 60% by weight. The polyurethanes present in the formulations have, as a rule, a K value of from 20 to 60 in N,N-dimethylformamide (DMF).

The K value is a relative viscosity number which is determined similarly to DIN 53,726 at 25° C. It is based on the flow rate of a 1% strength by weight solution of polyurethane in DMF relative to the flow rate of pure DMF and characterizes the mean molecular weight of the polyurethane.

The novel aqueous polyurethane formulations are particularly suitable as the bottoming coat for commercial finishes on leathers which have been fatliquored and/or rendered water repellant. Remarkably, the effect of the fatliquoring and/or the water repellant treatment is not substantially reduced. The presence of low molecular weight additives is not necessary. Advantageously, the novel aqueous formulations having a solids content of from 1 to 20% by weight are applied to the leather. Application may be effected in a conventional manner by means of a plush pad or by casting, spraying or printing. The bottoming coat is then dried, as a rule at from 60° to 80° C. The amount applied is usually from 1 to 15 g of dry material/m². After application of the bottoming coat, the finish is applied in a conventional manner. The finish generally consists of a plurality of coats and is applied in various colors by coloring with pigments and/or soluble dyes, in accordance with fashion requirements. In addition to these colored components, the formulations for the finish generally contain binders, for example those based on polymer solutions or dispersions, and assistants, such as plasticizers or curing agents, gloss-increasing or matt additives, agents for improving the handle, plating assistants or leveling agents. Frequently, the structure of a finish is divided into one or more base finish coats and subsequently one or more final coats (season). After application of the individual coats, as a rule drying and if necessary plating are carried out.

Alternatively to the method described, the leather may also be finished by a procedure in which the bottoming formulation is applied to the leather not alone but mixed with the formulation for the first base finish coat.

EXAMPLES

EXAMPLE 1

Preparation of novel aqueous formulations Z1 to Z6

Z1: A mixture of 34.8 kg of 2,4-diisocyanatotoluene, 8.7 kg of 2,6-diisocyanatotoluene, 200 kg of polypropylene glycol ($\overline{M}_n=2,000$), 20.1 kg of dimethylolpropionic acid and 0.1 kg of dibutyltin dilaurate was reacted for 5 hours at 95° C. Thereafter, the mixture was cooled to 30° C. and the content of unconverted NCO groups was determined: 0.148% by weight, based on the reaction mixture. Dilution was then carried out with 200 kg of acetone, and 10.1 kg of triethylamine and 625 kg of water was stirred in. After removal of the acetone by distillation, a roughly 30% strength by weight clear aqueous polyurethane formulation was obtained.

Z2: A mixture of 146.4 kg of 2,4-diisocyanatotoluene, 36.6 kg of 2,6-diisocyanatotoluene, 800 kg of polypropylene glycol ($\overline{M}_n=2,000$), 80.4 kg of dimethylolpropionic acid and 0.4 kg of dibutyltin dilaurate was reacted for 5 hours at 95° C. The mixture was then cooled to 30° C. and the content of unconverted NCO groups was determined: 0.42% by weight, based on the reaction mixture. Dilution was then carried out with 800 kg of acetone, and 60.6 kg of triethylamine and 2,000 kg of water was stirred in.

A solution of 8.5 kg of isophoronediamine and 300 kg of water was then added. After removal of the acetone by distillation, a roughly 33% strength by weight clear aqueous polyurethane formulation was obtained.

Z3: A mixture of 34.8 kg of 2,4-diisocyanatotoluene, 8.7 kg of 2,6-diisocyanatotoluene, 200 kg of polypropylene glycol ($\overline{M}_n=2,000$), 20.1 kg of dimethylolpropionic acid and 0.1 kg of dibutyltin dilaurate was reacted for 5 hours at 95° C. The mixture was then cooled to 30° C. and the content of unconverted NCO groups was determined: 0.14% by weight, based on the reaction mixture. Dilution was then carried out with 200 kg of acetone, and 15.1 kg of triethylamine and 625 kg of water was stirred in. After removal of the acetone by distillation, a roughly 31% strength by weight clear aqueous polyurethane formulation was obtained.

Z4: A mixture of 34.8 kg of 2,4-diisocyanatotoluene, 8.7 kg of 2,6-diisocyanatotoluene, 200 kg of polytetrahydrofuran ($\overline{M}_n=2,000$), 20.1 kg of dimethylolpropionic acid and 0.1 kg of dibutyltin dilaurate was reacted for 5 hours at 95° C. The mixture was then cooled to 30° C. and the content of unconverted NCO groups was determined: 0.18% by weight, based on the reaction mixture. Dilution was then carried out with 200 kg of acetone, and 15.1 kg of triethylamine and 870 kg of water was stirred in. After removal of the acetone by distillation, a roughly 24% strength by weight clear aqueous polyurethane formulation was obtained.

Z5: A mixture of 135.8 kg of 2,4-diisocyanatotoluene, 33.9 kg of 2,6-diisocyanatotoluene, 480 kg of a polybutylene oxide ($\overline{M}_n = 860$), initiated from butane-1,4-diol, 56.0 kg of dimethylolpropionic acid and 0.1 kg of dibutyltin dilaurate was reacted for 5 hours at 95° C. The mixture was then cooled to 30° C. and the content of unconverted NCO groups was determined: 0.13% by weight, based on the reaction mixture. Dilution was then carried out with 600 kg of acetone, and 41.0 kg of triethylamine and 1,740 kg of water was stirred in. After removal of the acetone by distillation, a roughly 30% strength by weight opaque aqueous polyurethane formulation was obtained.

Z6: A mixture of 55.6 kg of isophorone diisocyanate, 200 kg of polypropylene glycol ($\overline{M}_n = 2,000$), 20.1 kg of dimethylolpropionic acid and 0.5 kg of dibutyltin dilaurate was reacted for 8 hours at 100° C. The mixture was then cooled to 30° C. and the content of unconverted NCO groups was determined: 0.18% by weight. Dilution was then carried out with 200 kg of acetone, and 15.1 kg of triethylamine and 870 kg of water was stirred in. After removal of the acetone by distillation, a roughly 24% strength by weight clear aqueous polyurethane formulation was obtained.

EXAMPLE 2

Use of the novel aqueous formulations Z1 to Z6 as bottoming coats on water repellant chrome side leather (water repellancy based on silicone oil) and fatliquored nappa leather A1: A bottoming coat consisting of 168 g of Z1 and 832 g of water was applied to water repellant chrome side leather (one spray application, drying at 70° C., amount applied about 5 g of dry material per m²).

Thereafter, a commercial base finish formulation consisting of

| 50 g of Lepton ® Black (pigment formulation) | |
| 150 g of Lepton Binder DL) | Binder based on aqueous polymer dispersion |
| 50 g of Corialgrund ® IF) and | |
| 550 g of water | | was applied (two spray applications, drying at 70° C., plating in a hydraulic plating press at 70° C. and 50 bar, two further spray applications, drying at 70° C., total amount applied: about 25 g of dry material per m²), followed by a commercial season consisting of 200 g of Corial ® Finish EC (polymer solution as binder) 100 g of Corial matt coat CMR (matting agent) (®=registered trademark of BASF AG) 670 g of Corial diluent EB (leveling agent) and 30 g of Corial curing agent L (one spray application, drying at 70° C., amount applied: about 8 g of dry material per m²).

A1V: As for A1, but without bottoming coat.
A2: As for A1, except that the bottoming coat consisted of 152 g of Z2 and 848 g of water.
A2V: As for A2, but without the bottoming coat.
A3: As for A1, except that the bottoming coat consisted of 162 g of Z3 and 838 g of water.
A3V: As for A3, but without the bottoming coat.
A4: As for A1, except that the bottoming coat consisted of 209 g of Z4 and 791 g of water.
A4V: As for A4, but without the bottoming coat.
A5: As for A1, except that the bottoming coat consisted of 168 g of Z5 and 832 g of water.
A5V: As for A5, but without the bottoming coat.
A6: As for A1, except that the bottoming coat consisted of 209 g of Z6 and 791 g of water.
A6V: As for A6, but without, the bottoming coat.
A7: A mixture of 50 g of bottoming coat Z3 and 800 g of commercial base finish formulation consisting of 100 g of Lepton Black (pigment formulation), 80 g of Lepton Wax A (plating assistant)

| 200 g of Corial ® Finish EC (polymer solution as binder) | |
| 100 g of Corial matt coat CMR (matting agent) | |
| 100 g of Corialgrund IF | Binder based on aqueous polymer dispersions |
| 200 g of Lepton Binder LF and | |
| 320 g of water | |

(® = registered trademark of BASF AG)

was applied to fatliquored nappa leather (one spray application, drying at 70° C., plating in a hydraulic plating press at 80° C. and 50 bar, amount applied: about 20 g of dry material per m²). Thereafter, commercial base finish formulation was applied alone (without the addition of Z3; two spray applications, drying at 70° C., amount applied: about 30 g of dry material per m²), followed by a commercial season consisting of 50 g of Corial gloss coat FM (nitrocellulose solution as binder), 50 g of Corial matt coat NW (matting agent) and 250 g of Corial diluent A (leveling agent) (one spray application, drying at 70° C., amount applied: about 8 g of dry material per m²).

A7V: As for A7, but without Z3.
A8: A bottoming coat consisting of 270 g of Z3 and 730 g of water was applied to fatliquored nappa leather (one spray application, drying at 70° C., amount applied: about 8 g of dry material per m²).

Thereafter, a commercial base finish formulation consisting of 50 g of Lepton Black (pigment formulation), 30 g of Lepton Wax A (plating assistant)

| 50 g of Lepton Black (pigment formulation), | |
| 30 g of Lepton Wax A (plating assistant) | |
| 180 g of Lepton Binder DL | Binder based on aqueous polymer dispersions |
| 70 g of Corialgrund IF and | |
| 470 g of water | | was applied (one spray application, drying at 70° C., plating in a hydraulic plating press at 80° C. and 50 bar, two further spray applications, drying at 70° C., total amount applied: 40 g of dry material per m²), followed by a commercial season consisting of 200 g of Corial Finish EC (polymer solution as binder), 100 g of Corial gloss coat AW (gloss assistant), 670 g of Corial diluent EB (leveling agent) and 30 g of Corial curing agent L (two spray applications, drying at 70° C., plating in a hydraulic plating press at 80° C. and 50 bar, amount applied: about 10 g of dry material per m²).

A8V: As for A8, but without bottoming coat.

The wet and dry adhesion of the finish were determined for the leathers finished in this manner in accordance with IUF 470 (IUF=International Union Fastness, Standard of the International Fastness Commission for leather dyes and dyed leather). The quality of the water repellancy was determined in accordance with DIN 53,338 using a penetrometer with 15% compression, the finish in the case of the finished leathers having been roughened beforehand. For the water repellant chrome side leather which had not been finished, the following values were determined in a corresponding manner:

Water penetration time: >6 h
Water absorption: 10% by weight (after 6 h, based on initial weight of the leather).

The other results are shown in the Table.

TABLE

| Use Example | Adhesion (N/cm) Dry/Wet | Water penetration time (h) | Water penetration (g/h) | Water absorption (% by weight after 6 h) |
|---|---|---|---|---|
| A1 | 3.3/2.8 | 4 | 0.05 | 11 |
| A1V | 1.3/1.7 | >6 | — | 10 |
| A2 | 4.6/2.4 | 4 | 0.07 | 8 |
| A2V | 1.5/1.9 | >6 | — | 8 |
| A3 | 4.6/3.6 | >6 | — | 10 |
| A3V | 1.3/1.7 | >6 | — | 10 |
| A4 | 9.6/5.1 | >6 | — | 9 |
| A4V | 1.6/1.8 | >6 | — | 10 |
| A5 | 3.3/2.5 | >6 | — | 10 |
| A5V | 1.6/1.8 | >6 | — | 10 |
| A6 | 4.0/3.5 | >6 | — | 9 |
| A6V | 1.6/1.8 | >6 | — | 10 |
| A7 | 7.5/2.5 | | | |
| A7V | 3.5/2.0 | | | |
| A8 | 6.6/2.8 | | | |
| A8V | 3.0/1.8 | | | |

We claim:

1. A finished leather comprising leather which has not been fat liquored and/or rendered water repellant, a fat liquoring and/or water repellant agent applied to such leather, a dried adhesion improving coating composition applied thereto, the adhesion improving coating composition consisting of a bottoming coat composition containing polyurethane A, as defined below, alone or admixed with a base leather finish as defined below, the adhesion improving coating composition containing 1 to 20% polyurethane A, and a base leather finish upon said dried adhesion improving coating composition which comprises a binder which is not polyurethane A and a coloring agent wherein the polyurethane A improves the adhesion of the leather finish coating to the leather to which the fat liquoring and/or watery repellant agent has been applied, and is present only in the dried adhesion improving coating, and wherein the bottoming coat composition is an aqueous polyurethane formulation consisting essentially of one or more polyurethanes A which consists essentially of a) one or more organic diisocyanates or a mixture of organic isocyanates which has an arithmetic mean NCO functionality of from 1.9 to 2.3 (monomers I), b) one or more dihydric polyether alcohols having a number average molecular weight of from 500 to 5,000 or a mixture of polyether alcohols which has an arithmetic mean functionality of alcoholic OH groups of 1.6 to 2 and a number average molecular weight of from 500 to 5,000 (monomers II), c) one or more alcohols containing from 1 to 3 alcoholic OH groups and not less than one ionic group (monomers III), d) no dihydric alcohols or one or more dihydric alcohols having a number average molecular weight of from 62 to 499 (monomers IV), and e) one or more polyamines having not less than two

groups or no such polyamines (monomers VI), with the proviso that the amounts of incorporated monomers I to VI are such that the ratios of the number of equivalents of OH to that of NCO are from 0.2 to 0.6 for the incorporated monomers II/monomers I, from 0.2 to 0.8 for the incorporated monomers III/monomers I, from 0. to 0.2 for the incorporated monomers IV/monomers I and the ratio of the number of equivalents of —N—H to that of NCO is from 0 to 0.1 for the incorporated monomers VI/monomers I, that the arithmetic mean functionality of all the monomers I to IV incorporated is from 1.8 to 2.3, averaged over the sum of the NCO groups of the monomers I and the alcoholic OH groups of the monomers II to IV, that the ratio of the number of equivalents of NCO to that of

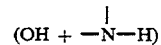

for the incorporated monomers I, the OH groups for the incorporated monomers II to IV and the

groups of the incorporated monomers VI is from 0.9 to 1.0 and, where monomers VI are simultaneously incorporated, the ratio of the number of equivalents of NCO to that of OH for the incorporated monomers I and the sum of the incorporated monomers II to IV is greater than 1, that the monomers II have a degree of ethoxylation of less than 30% by weight and that from 0.05 to 0.2 mmol of the ionic groups of the incorporated monomers III are present in ionized form per gram of polyurethane A in the aqueous formulation.

2. A finished leather according to claim 1 wherein the dried adhesion improving coating composition consists of the dried bottoming coat.

3. A finished leather according to claim 1 wherein the dried adhesion improving containing composition consists of a dried admixture of the bottoming coat and the base leather finish.

4. A finished leather according to claim 1 wherein a fat liquoring agent has been applied to the leather.

5. A finished leather according to claim 1 where the leather has been rendered water repellant by silicone oil.

* * * * *